(12) United States Patent
Chang et al.

(10) Patent No.: US 9,536,360 B2
(45) Date of Patent: Jan. 3, 2017

(54) VEHICLE ELECTRONIC KEY SYSTEM

(71) Applicant: HON HAI PRECISION INDUSTRY CO., LTD., New Taipei (TW)

(72) Inventors: Chia-Wei Chang, New Taipei (TW); Shiang-Hua Lin, New Taipei (TW); Ping-Mao Lee, New Taipei (TW); Kuang-Yao Liao, New Taipei (TW); Chih-Chung Weng, New Taipei (TW); Hsin-Nan Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/688,656

(22) Filed: Apr. 16, 2015

(65) Prior Publication Data

US 2016/0148453 A1    May 26, 2016

(30) Foreign Application Priority Data

Nov. 26, 2014  (TW) .............................. 103141101 A

(51) Int. Cl.
*G10L 17/00*     (2013.01)
*G07C 9/00*      (2006.01)

(52) U.S. Cl.
CPC ....... *G07C 9/00071* (2013.01); *G07C 9/00563* (2013.01); *G10L 17/005* (2013.01); *G07C 2009/00603* (2013.01); *G10L 17/00* (2013.01)

(58) Field of Classification Search
CPC ..... G10L 17/00; G10L 17/005; G07C 9/00071
See application file for complete search history.

(56) References Cited

U.S. PATENT DOCUMENTS

| | | | | |
|---|---|---|---|---|
| 2003/0231550 A1* | 12/2003 | Macfarlane | ........... | B60R 25/257 367/198 |
| 2004/0145491 A1* | 7/2004 | Nascimento | ............ | B60R 25/24 340/13.31 |
| 2004/0212478 A1* | 10/2004 | Kutsuzawa | ............. | B60R 25/25 340/5.6 |
| 2005/0099275 A1* | 5/2005 | Kamdar | .............. | B60R 25/2009 340/426.18 |
| 2005/0179542 A1* | 8/2005 | Young | .................. | B60R 25/257 340/539.32 |

(Continued)

*Primary Examiner* — Douglas Godbold
(74) *Attorney, Agent, or Firm* — Zhigang Ma

(57) ABSTRACT

A vehicle electronic key system for unlocking a vehicle includes an electronic key and a vehicle controlling device. The electronic key includes a first controller, a signal transmitting module configured to collet and transmit speech signals, and a wireless charging receiving coil configured to transmit electromagnetic signals to the first controller. The vehicle controlling device includes a second controller configured to authenticate the speech signals and unlock the vehicle, a signal receiving module configured to receive speech signals sent by the signal transmitting module and send the speech signals to the second controller, and a wireless charging transmitting coil configured to transmit the electromagnetic signals to the wireless charging receiving coil. The second controller is further configured to drive the wireless charging transmitting coil. The first controller is configured to convert the electromagnetic signals to electric energy and send the electric energy to the signal transmitting module.

7 Claims, 2 Drawing Sheets

(56) References Cited

U.S. PATENT DOCUMENTS

| | | | |
|---|---|---|---|
| 2008/0147304 A1* | 6/2008 | Pai | G07C 9/00309 |
| | | | 701/115 |
| 2009/0024394 A1* | 1/2009 | Nakashima | G08G 1/005 |
| | | | 704/275 |
| 2009/0190735 A1* | 7/2009 | Gilmartin | B60R 16/0373 |
| | | | 379/201.12 |
| 2009/0278698 A1* | 11/2009 | Kamiki | B60K 28/063 |
| | | | 340/576 |
| 2013/0305323 A1* | 11/2013 | Kleve | H04L 9/3215 |
| | | | 726/4 |
| 2015/0116079 A1* | 4/2015 | Mishra | G07C 9/00007 |
| | | | 340/5.52 |
| 2015/0120151 A1* | 4/2015 | Akay | B60R 25/24 |
| | | | 701/49 |
| 2015/0171659 A1* | 6/2015 | Lee | H02J 17/00 |
| | | | 320/108 |
| 2015/0363988 A1* | 12/2015 | Van Wiemeersch | H04M 1/11 |
| | | | 455/557 |

* cited by examiner

VEHICLE ELECTRONIC KEY SYSTEM

FIELD

The subject matter herein generally relates to a vehicle electronic key system.

BACKGROUND

The use of passive keyless entry (PKE) systems in automobiles has increased significantly recently. The PKE systems have increased the convenience of entering an automobile, especially when the vehicle operator's hands are full. They also are more secure than prior key-based security systems. The PKE system enables a driver lock/unlock an automobile using an electronic key.

BRIEF DESCRIPTION OF THE DRAWINGS

Implementations of the present technology will now be described, by way of example only, with reference to the attached figures.

DETAILED DESCRIPTION

Figure 1:
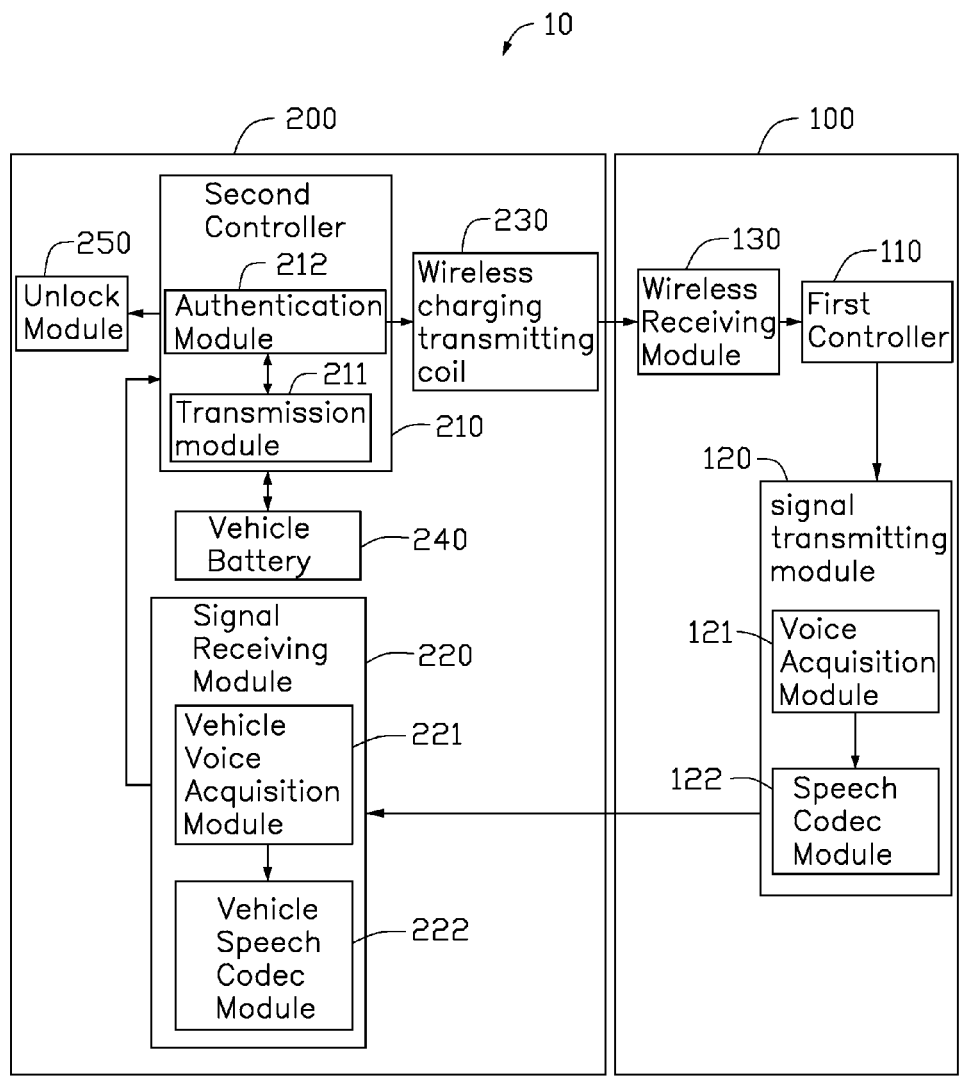
FIG. 1 is a block diagram of one embodiment of a vehicle electronic key system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

The present disclosure is described in relation to a vehicle electronic key system.

FIG. 1 illustrates that a vehicle electronic key system 10 can includes an electronic key 100 and a vehicle controlling device 200. The vehicle controlling device 200 can be mounted in a vehicle (not shown).

The electronic key 100 can include a first controller 110, a signal transmitting module 120, and a wireless charging receiving coil 130. The wireless charging receiving coil 130 can be configured to receive electromagnetic signals and send the electromagnetic signals to the first controller 110. The first controller 110 can be configured to convert the electromagnetic signals to electronic energy, and send the electronic energy to the signal transmitting module 120.

The signal transmitting module 120 can be configured to collet and transmit speech signals. In at least one embodiment, the signal transmitting module 120 can include a speech acquisition module 121 and a speech codec module 122 electrically connected to the speech acquisition module 121. The speech acquisition module 121 can be configured to collet the speech signals input by an user, convert the speech signals to speech analog signals, and transmit the speech analog signals to the speech codec module 122. The speech codec module 122 can be configured to convert the speech analog signals to speech digital signals, and transmit the speech digital signal to the vehicle controlling device 200.

The vehicle controlling device 200 can include a second controller 210, a signal receiving module 220, a wireless charging transmitting coil 230, a vehicle battery 240, and a unlock module 250.

The signal receiving module 220 can be configured to receive the speech digital signal transmitted by the signal transmitting module 120, and send the speech digital signal to the second controller 210.

The second controller 210 can include a transmitting module 211 and an authorization module 210. The transmitting module 211 can be configured to receive the speech digital signal transmitted by the signal receiving module 220, and send the speech digital signal to the authorization module 212. The authorization module 212 can be configured to store speech samples of one or more vehicle owners, and compare the speech digital signal with the speech samples to authenticate for the user. If the authentication is successful, the second controller 210 can control the vehicle battery 240 to supply electrical energy to the wireless charging transmitting coil 230, and send a control signal to the unlock module 250 for unlocking the vehicle.

In at least one embodiment, the signal receiving module 220 can include a vehicle speech acquisition module 221 and a vehicle speech codec module 222. The vehicle speech acquisition module 221 can be configured to collet the speech samples of the vehicle owner, and the vehicle speech codec module 222 can be configured to convert the speech samples to speech digital signals and transmit the speech digital signals to the second controller 210, then the speech digital signals of the speech samples can be stored in the authorization module 212.

The wireless charging transmitting coil 230 can be configured to transmit the electromagnetic signals to the wireless charging receiving coil 130 controlled by the second controller 210. The wireless charging receiving coil 130 can transmit the electromagnetic signal to the first controller 110, and the first controller 110 can convert the electromagnetic signal to the electric energy and send the electric energy to the signal transmitting module 120, so the signal transmitting module 120 can work without consuming of electricity of the electronic key 100.

The vehicle battery 240 can be configured to transmit the electric energy signal to the second controller 210. When the authentication is successful, the transmitting module 211 can send a control signal to the vehicle battery 240, and the vehicle battery 240 can transmit electric energy signal to the second controller 210, then the second controller 210 can transmit the electric energy signal to the wireless charging transmitting coil 230.

The unlock module 250 can be electrically connected to the second controller 210. After the authorization module 212 authenticates for the user, the transmitting module 211 can send a control signal to the unlock module 250, and the unlock module 250 can lock or unlock the vehicle upon receiving the control signal.

In use, if the user use the electronic key system 10 for the first time, the user need to establish the speech sample using the vehicle controlling device 200. If the users are more then one, more than one speech samples can be stored in the second controller 210 corresponding to the users.

Figure 2:
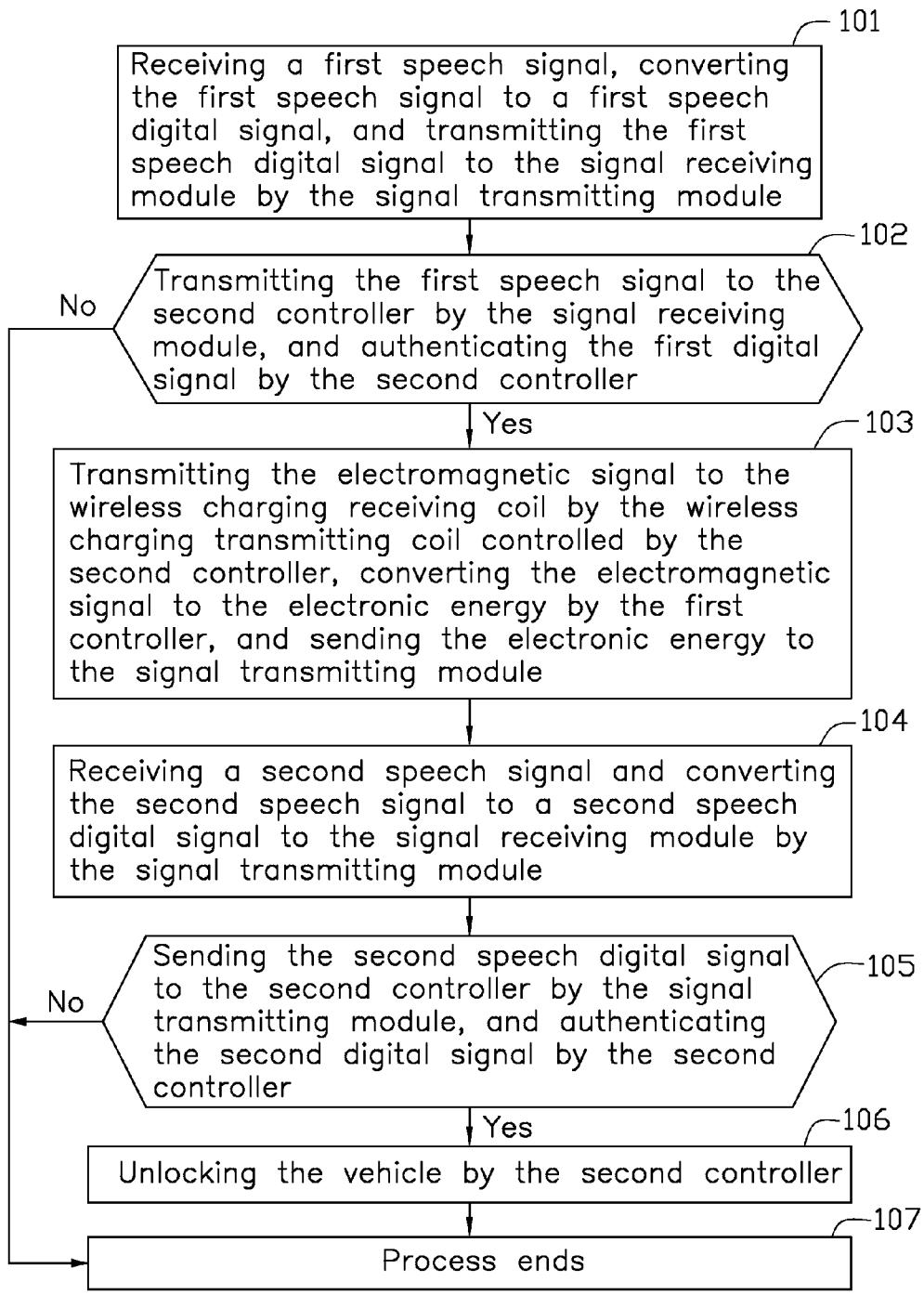
FIG. 2 is a flow chart of unlocking a vehicle using the vehicle electronic key system in FIG. 1.

Referring to FIG. 2, a flowchart of unlocking the vehicle door is presented in accordance with an example embodiment which is being thus illustrated. The example method is provided by way of example, as there are a variety of ways to carry out the method. The method described below can be carried out using the configurations illustrated in FIGS. 1 and 2, for example, and various elements of these figures are referenced in explaining example method. Each block shown in FIG. 2 represents one or more processes, methods or subroutines, carried out in the example method. Furthermore, the illustrated order of blocks is by example only and the order of the blocks can change according to the present disclosure. Additional blocks may be added or fewer blocks may be utilized, without departing from this disclosure. The example method can begin at block 101.

At block 101, the wireless charging transmitting coil 230 can transmit electromagnetic signal. When the electronic key 100 gets close to the vehicle, the user can input a first speech signal to the electronic key 100. The signal transmitting module 120 can convert the first speech signal to a first digital signal, and transmit the first digital signal to the signal receiving module 200.

At block 102, the signal receiving module 220 can transmit the first digital signal to the transmitting module 211 of the second controller 210, and the authorization module 212 can authenticate the first digital signal.

At block 103, if the authentication is successful, the second controller 210 can drive the wireless charging coil 230 to transmit the electromagnetic signal to the wireless charging receiving coil 130. The first controller 110 can convert the electromagnetic signal to the electric energy, and send the electric energy to the signal transmitting module 120. If the authentication is failure, the process ends.

At block 104, the user can input a second speech signal to the electric key 100, and the signal transmitting module 120 can convert the second speech signal to a second digital signal, and send the second digital signal to the signal receiving module 220.

At block 105, the signal receiving module 220 can send the second digital signal to the second controller 210, and the authorization module 212 can authenticate the second digital signal.

At block 106, If the authentication is successful, the second controller 210 can control the unlock module 250 to unlock the vehicle. If the authentication is failure, the unlock module 250 would not unlock the vehicle.

At block 107, the process ends.

In other embodiments, if the user would not like to charge the electric key 100, the process can begin at block 104.

In other embodiments, the electric key 100 can further include a battery (not shown). The battery can be electrically connected to the first controller 110, and the first controller 110 can send the electric energy to the battery.

The vehicle electronic key system 10 of this disclosure includes the speech codec module 122 which can encode the speech signal, and the second controller 210 of the vehicle controlling device 200 can authenticate the speech signal. The vehicle electronic key system 10 can authenticate for the user using speech recognition to unlock the vehicle. As the speech recognition technology is high-security, a thief can not unlock the vehicle even if he got the electronic key 100. Therefore, the vehicle electronic key system 10 can be safety.

The embodiments shown and described above are only examples. Many details are often found in the art such as the other features of a vehicle electronic key system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A vehicle electronic key system for unlocking a vehicle, the vehicle electronic key system comprising:
    an electronic key comprising
        a first controller,
        a signal transmitting module configured to collect and transmit speech signals, and
        a wireless charging receiving coil configured to transmit electromagnetic signals to the first controller, and
    a vehicle controlling device mounted on the vehicle comprising:
        a second controller configured to authenticate the speech signals and unlock the vehicle,
        a vehicle battery configured to send electric energy signal to the second controller,
        a signal receiving module configured to receive speech signals sent by the signal transmitting module and send the speech signals to the second controller, and
        a wireless charging transmitting coil configured to transmit the electromagnetic signals to the wireless charging receiving coil;
    wherein the second controller is further configured to drive the wireless charging transmitting coil, and the first controller is configured to convert the electromagnetic signals to electric energy and send the electric energy to the signal transmitting module; and
    wherein the second controller is further configured to receive the electric energy signal transmitted by the vehicle battery, and send the electric energy signal to the wireless charging transmitting coil only when the speech signals are authenticated.

2. The vehicle electronic key system of claim 1,
    wherein the signal transmitting module comprises a speech acquisition module and a speech codec module electrically connected to the speech acquisition module;
    wherein the speech acquisition module is configured to collect the speech signals and convert the speech signals to analog signals; and
    wherein the speech codec module is configured to encode the analog signals to the digital signals.

3. The vehicle electronic key system of claim 1, wherein the signal receiving module is further configured to collet speech samples, and the signal receiving module comprises a vehicle speech acquisition module and a vehicle speech codec module.

4. The vehicle electronic key system of claim 3, wherein the second controller further comprises an authorization module configured to authenticate for user by comparing the speech signals collected by the signal transmitting module with the speech samples signals.

5. The vehicle electronic key system of claim 4, wherein the second controller further comprises a transmitting module, and the transmitting module is configured to receive the speech signals sent by the signal receiving module and send the speech signal to the authorization module.

6. The vehicle electronic key system of claim 1, wherein the vehicle controlling device further comprises a unlock module electrically connected to the second controller, and the unlock module is configured to lock and unlock the vehicle controlled by the second controller.

7. The vehicle electronic key system of claim 1, wherein the electronic key further comprises a battery electrically connected to the first controller, and the first controller is further configured to send the electric energy to the electronic key battery.

* * * * *